(12) United States Patent
Collins

(10) Patent No.: US 8,176,929 B1
(45) Date of Patent: May 15, 2012

(54) LINE-STOPPING SHEATH SPIGOT ASSEMBLIES AND LINE-STOPPING SHEATH ASSEMBLIES USING THE SAME

(75) Inventor: Aaron Caldwell Najera Collins, Nash, TX (US)

(73) Assignee: JCM Industries, Inc., Nash, TX (US)

( * ) Notice: Subject to any disclaimer, the term of this patent is extended or adjusted under 35 U.S.C. 154(b) by 273 days.

(21) Appl. No.: 12/586,977

(22) Filed: Sep. 30, 2009

(51) Int. Cl.
*F16L 23/00* (2006.01)

(52) U.S. Cl. ............... 137/15.12; 137/317; 285/197; 285/405; 285/416

(58) Field of Classification Search ............... 137/317, 137/318, 15.12, 15, 13; 285/197, 405, 414, 285/416
See application file for complete search history.

(56) References Cited

U.S. PATENT DOCUMENTS

| 3,687,490 | A | * | 8/1972 | Dunmire | 285/197 |
| 5,374,087 | A | * | 12/1994 | Powers | 285/197 |
| 5,590,913 | A | * | 1/1997 | Morris et al. | 285/197 |
| 5,971,001 | A | * | 10/1999 | Andersson | 137/318 |
| 7,111,876 | B2 | * | 9/2006 | Hayashi et al. | 285/415 |

* cited by examiner

*Primary Examiner* — Kevin Lee
(74) *Attorney, Agent, or Firm* — Thompson & Knight, LLP; James J. Murphy

(57) ABSTRACT

A spigot for a line-stopping sheath assembly includes a flange including a flange plate and a flange barrel. The flange barrel includes a wall extending from the flange plate, with an end of the wall of the flange barrel opposing the flange plate having a projection defining a periphery of a socket area for receiving an end of a pipe. The spigot also includes a pipe having an end disposed within the periphery of the socket area defined by the projection of the flange barrel.

28 Claims, 14 Drawing Sheets

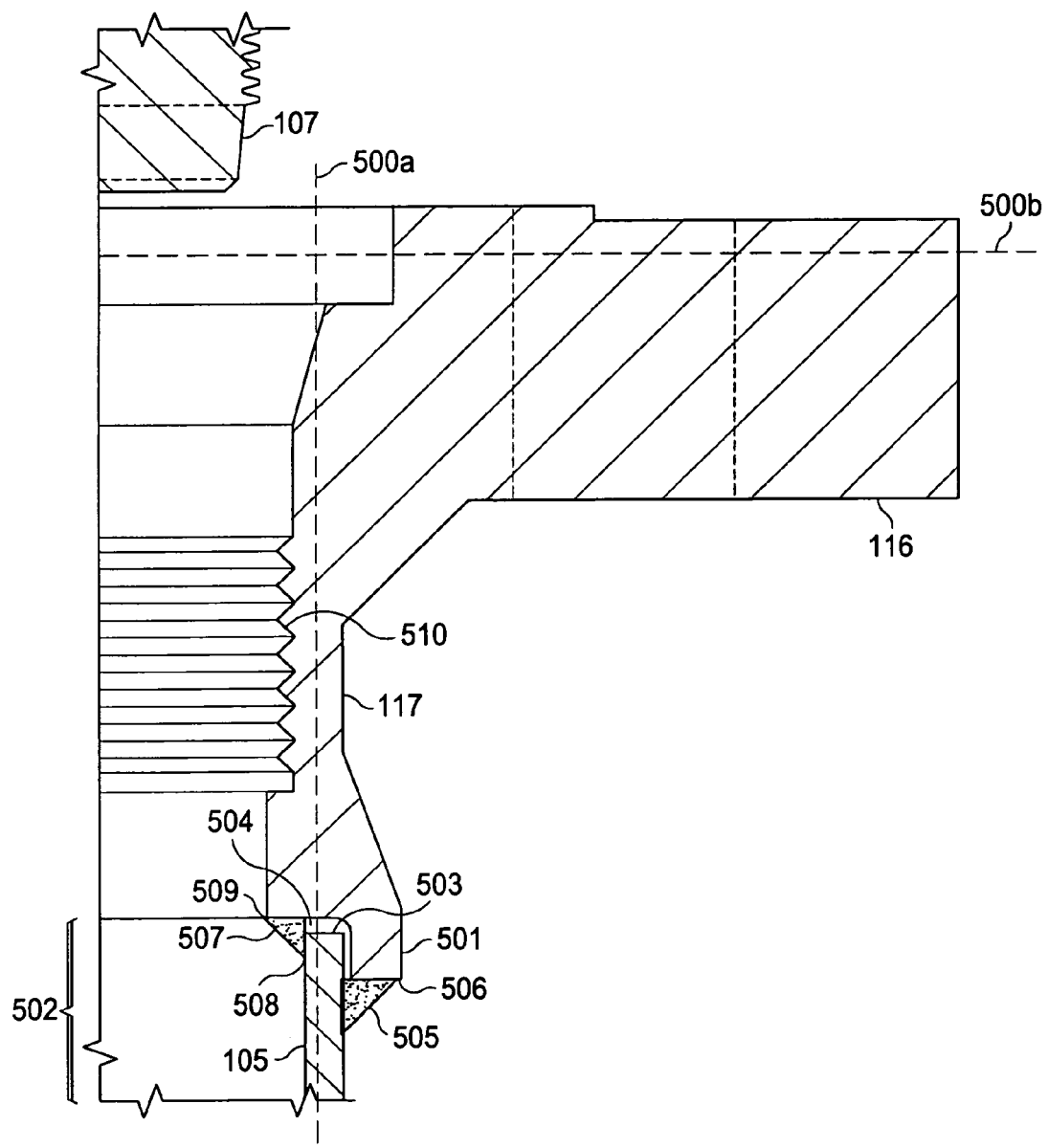

LINE-STOPPING SHEATH SPIGOT ASSEMBLIES AND LINE-STOPPING SHEATH ASSEMBLIES USING THE SAME

FIELD OF INVENTION

The present invention relates in general to pipeline equipment, and in particular, to line-stopping sheath spigot assemblies and line-stopping sheath assemblies using the same.

BACKGROUND OF INVENTION

It is sometimes necessary to stop fluid flow through a pipeline, for example a water pipeline, without the assistance of a valve. For example, a section of pipeline may not be controlled by an upstream valve that will allow fluid flow to be shut-off during pipeline repairs. Alternatively, the pipeline may include a valve, but that valve may be broken or otherwise not fully functioning. In either case, plugging may be used to temporarily shut-off the fluid flow such that needed repairs or other servicing operations can be made to a section pipeline.

In one type of plugging operation, two halves line-stopping sheath or sleeve are placed around the pipe at a point along the pipeline where fluid flow is to be shut-off. The two halves of the sheath are typically bolted together. The upper half of the sheath supports a spigot assembly (i.e. a short piece of pipe welded to a flange), to which a temporary valve is then attached. An operator then extends a tapping machine through the temporary valve and the spigot assembly and taps an aperture into the wall of the underlying pipe. The temporary valve is used to prevent fluid escape after the tapping machine is removed.

Next, a plugging machine is used to extend a plug through the temporary valve (which is again opened), the spigot assembly, and the aperture through the pipe wall. Once the plug is in place within the inner walls of the pipe, the fluid flow is stopped and repairs or other service work can be performed downstream of the plug. In some instances, a bypass may be put in place around the length of pipe under repair.

The pipe normally used to fabricate the each spigot assembly is relatively expensive, especially if stainless steel pipe is used. For example, 3/8 to 1/2 inch thick stainless steel pipe typically costs on the order of $200 dollars per linear foot, which significantly adds to the cost of each spigot assembly and consequently to the cost of the overall line-stopping sheath assembly. Moreover, the flange portion of the spigot assembly may be fabricated from stainless steel, which adds further expense and weight to the sheath assembly.

It would be highly advantageous to reduce the cost of each spigot, and in turn the cost of each spigot-flange assembly, as well as the overall line stopping assembly. Furthermore, reducing the weight of the spigot-flange assembly would also realize significant advantages.

SUMMARY OF INVENTION

The principles of the present invention are embodied in a spigot for a line-stopping sheath assembly that includes a flange including a flange plate and a flange barrel. The flange barrel includes a wall extending at an angle from the flange plate, with an end of the wall of the flange barrel opposing the flange plate having a projection defining a periphery of a socket area for receiving an end of a pipe. The spigot also includes a pipe having an end disposed within the periphery of the socket area defined by the projection of the flange barrel.

Embodiments of the present principles realize significant advantages over the prior art. For example, in a line-stopping spigot assembly including a flange and a spigot pipe, the spigot is advantageously fabricated with a sidewall that is substantially thinner than the sidewalls of the line-stopping spigot pipes of the prior art. This reduction in sidewall thickness directly reduces the cost of fabricating the spigot assembly, and in turn the cost of fabricating entire line-stopping sleeves.

BRIEF DESCRIPTION OF DRAWINGS

For a more complete understanding of the present invention, and the advantages thereof, reference is now made to the following descriptions taken in conjunction with the accompanying drawings, in which:

FIG. 5C is a diagram providing a more detailed cutaway view of the interface between the spigot flange and the spigot pipe of FIGS. 5A and 5B according to the principles of the present invention.

DETAILED DESCRIPTION OF THE INVENTION

The principles of the present invention and their advantages are best understood by referring to the illustrated embodiment depicted in FIGS. 1-6 of the drawings, in which like numbers designate like parts.

Figure 1A:
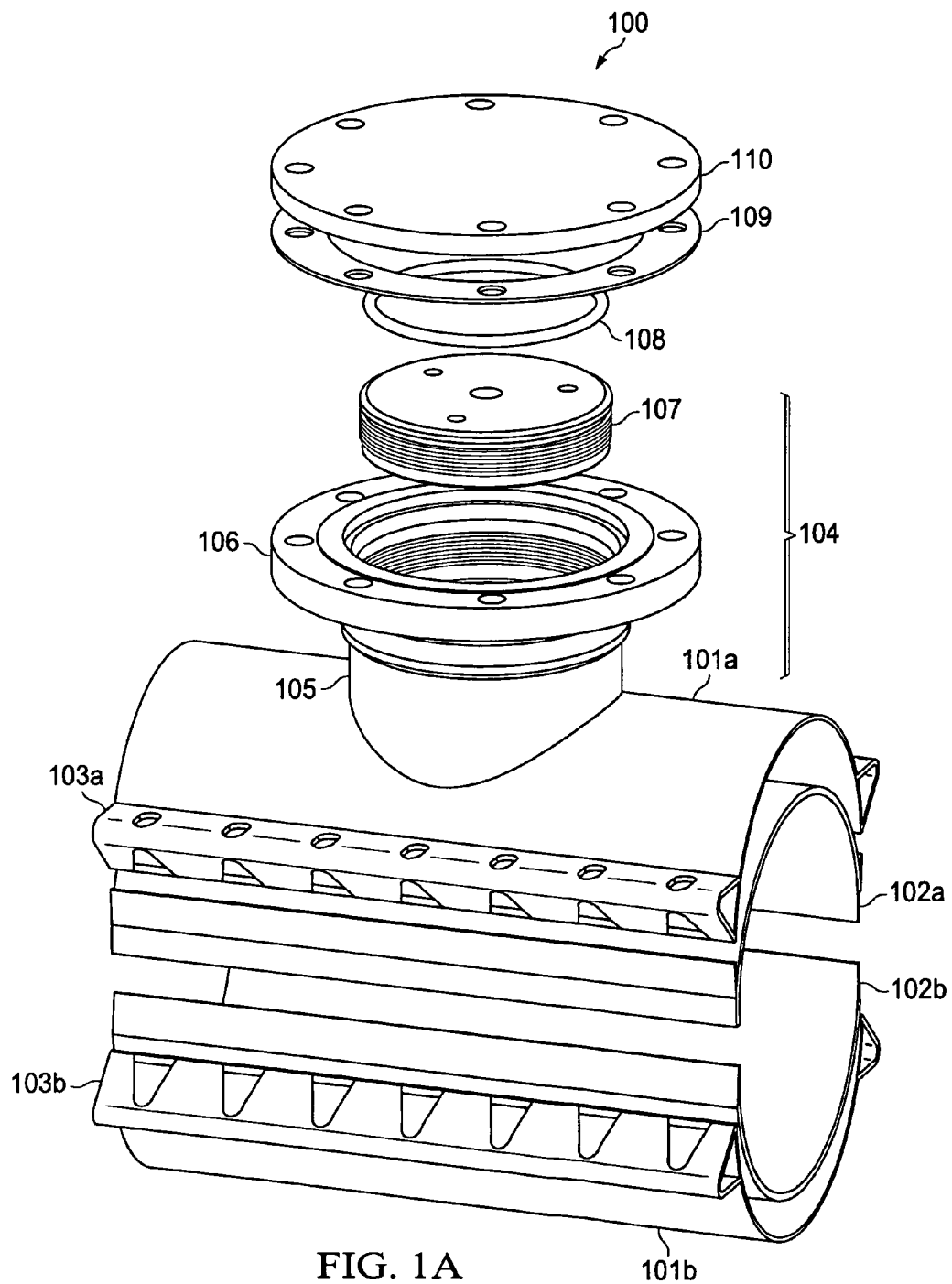
FIG. 1A is a diagram providing an exploded view of a line-stopping sheath assembly according to one exemplary embodiment of the principles of the present invention.

FIG. 1A is a diagram of an exemplary tapping/plugging sheath assembly 100 embodying the principles of the present invention. As shown in FIG. 1A, tapping/plugging sheath assembly includes first and second half sheaths 101a and 101b, each of which supports a corresponding gasket 102a-102b. Half sheaths 101a-101b are, for example, fabricated from stainless steel, steel, or other rigid material. Gaskets 102a-102b are fabricated, for example, from rubber or other resilient material.

Half sheaths 101a-101b and gaskets 102a-102b are dimensioned to be disposed around the circular outer surface of a section of pipe being tapped and plugged using the procedure discussed above. Half sheath 101a includes a pair of opposing lugs 103a and half sheath 101b includes a pair of corresponding opposing lugs 103b, which allow half sheaths 101a and 101b to be firmly bolted together around the corresponding section of pipe, as discussed below in conjunction with FIGS. 1B and 1C.

Half sheath 101 supports a spigot assembly 104 including a spigot pipe 105 and spigot flange 106. When line-stopping assembly 100 is mounted to a corresponding section of pipe, spigot assembly 104 allows the corresponding section of pipe to be tapped and plugging equipment to be extended into the pipe interior. When not in use for tapping and plugging operations, a plug 107 is threaded into spigot assembly 104. A rubber o-ring gasket 108 fits in a corresponding groove around the periphery of plug 107 and provides a complete seal that is independent of the seal provided by the following flange gasket 109 and flange cover 110. Flange cover 110 is bolted to spigot flange 106 with a set of conventional bolts (not shown), which extend through corresponding apertures in flange gasket 109 and flange cover 110.

Figure 1B:
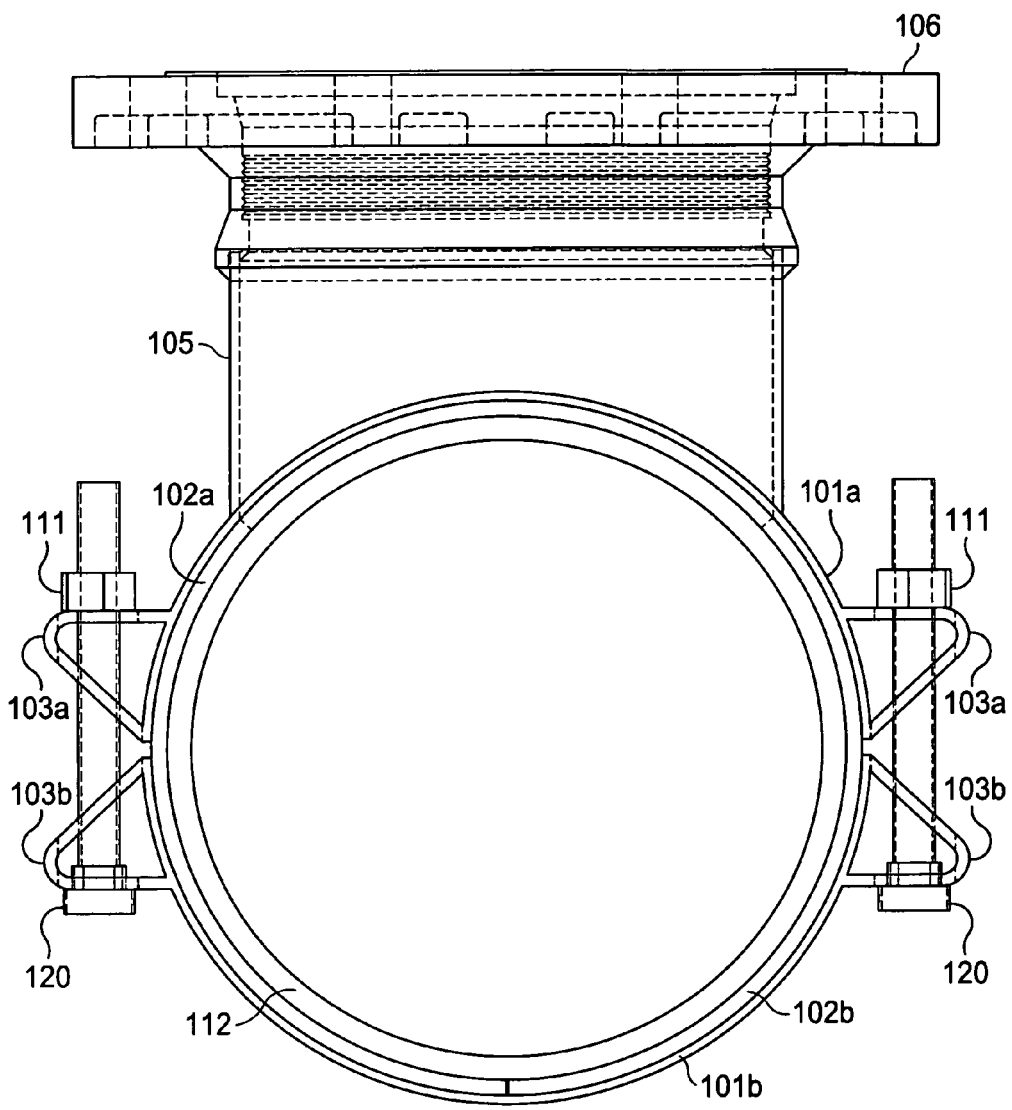
FIGS. 1B and 1C are diagrams providing respective end and side views showing the line-stopping sheath assembly of FIG. 1A attached to a corresponding length of pipe in a typical pipe-line-stopping application.
Figure 1C:
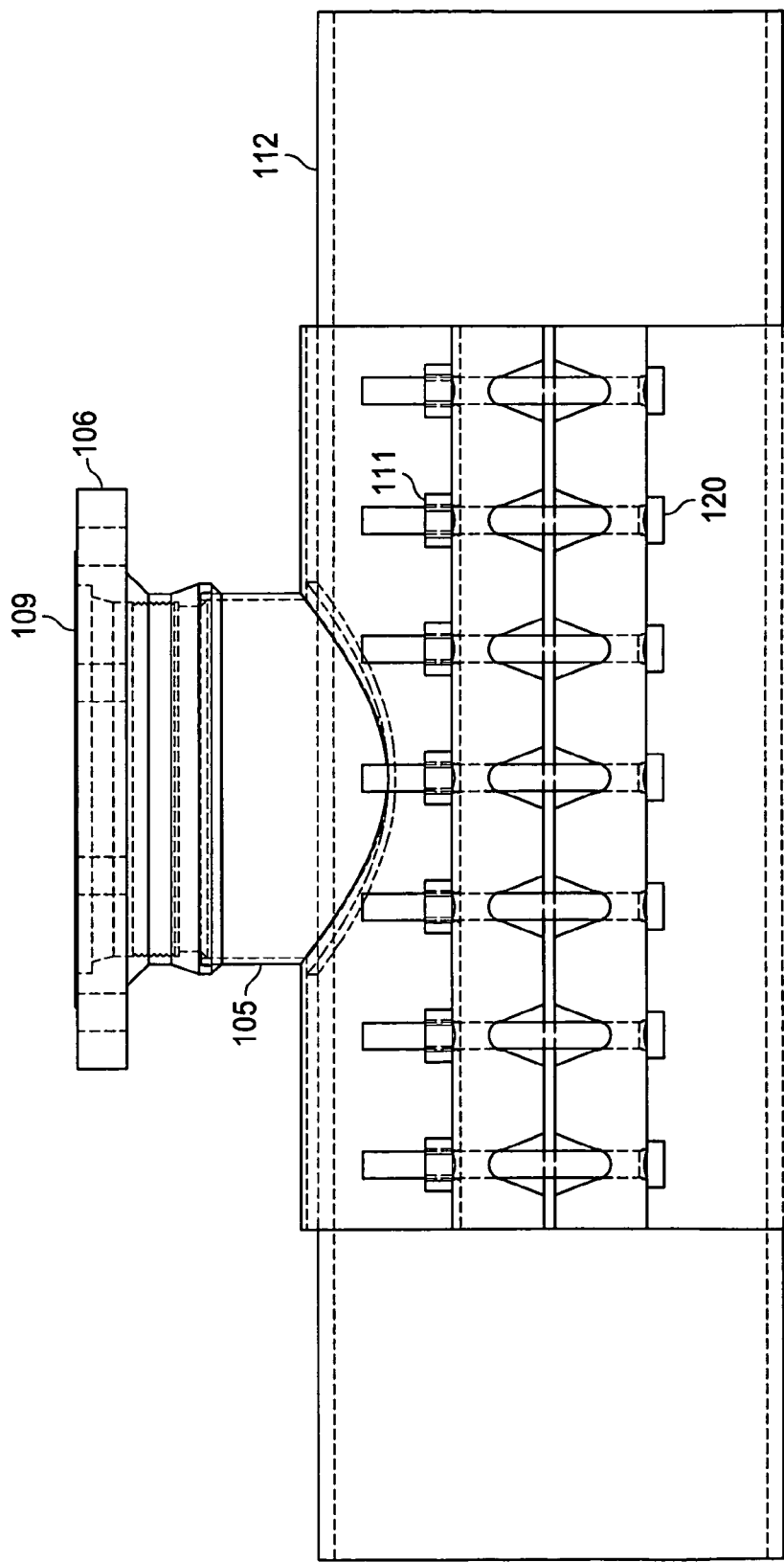

FIGS. 1B and 1C show tapping/plugging assembly 100 firmly attached to a corresponding section of pipe 112 by a set of bolts 120, which extend through corresponding lugs 103a-103b, and associated nuts 111. When half sheaths 101a and 101b are tightly clamped around pipe section 112, gaskets 102a and 102b provide a firm seal around the periphery of the plugging aperture created through the wall of pipe 112. In one alternate embodiment, spigot assembly 104 is fastened to section of pipe 112 by a single half sheath 101a, which is welded to pipe section 112. In another alternate embodiment, the distal end of spigot pipe 105 is directly welded to pipe section 112.

Figure 2A:
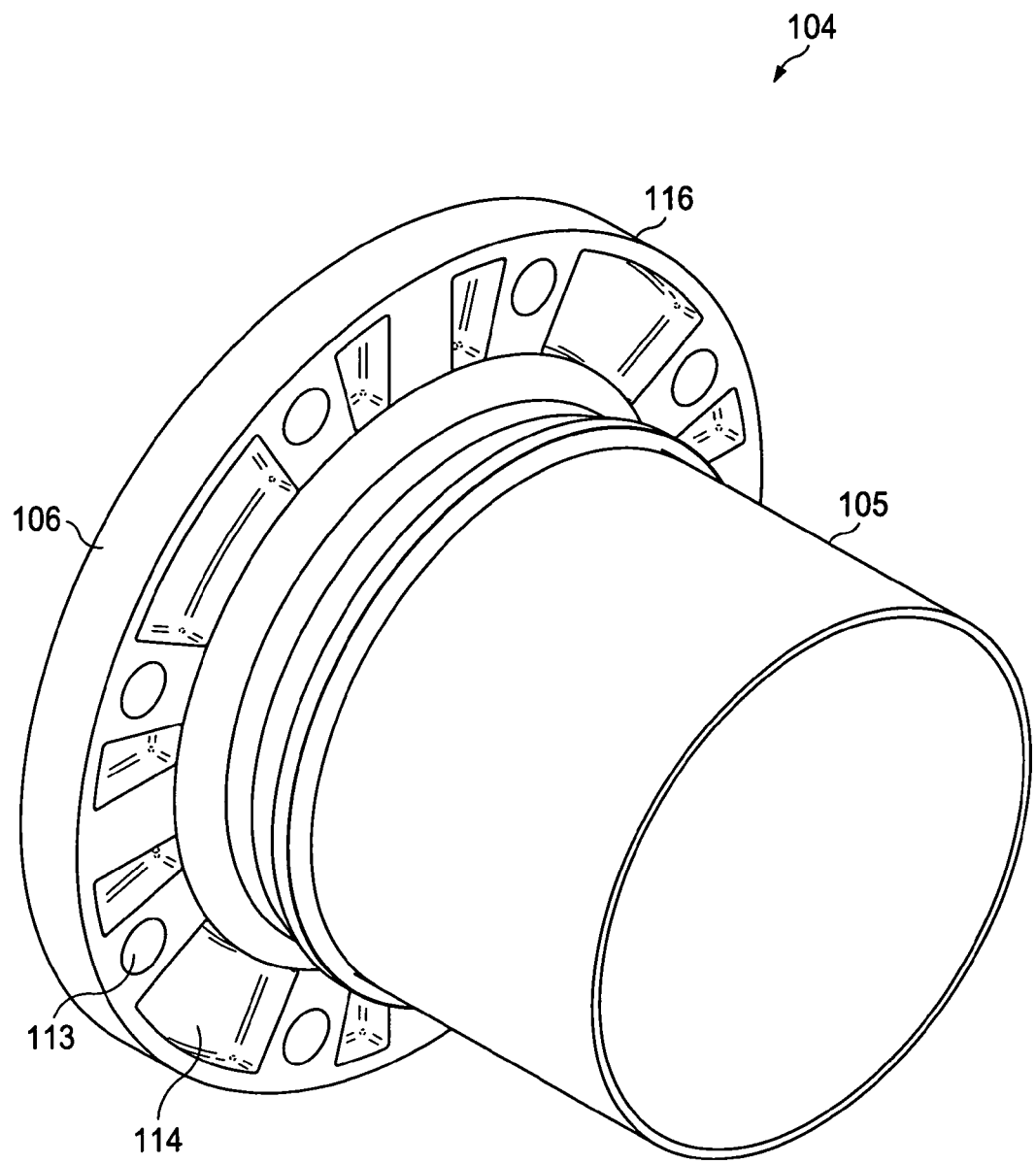
FIG. 2A is a diagram providing a more detailed view of the spigot assembly shown in FIG. 1A.
Figure 2C:
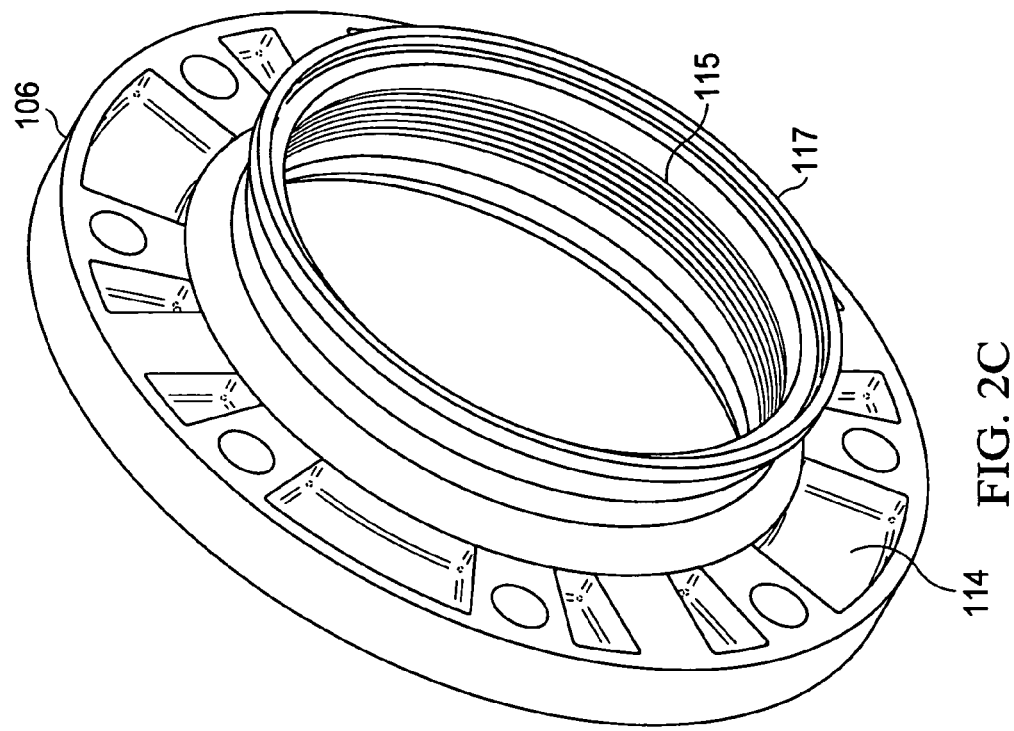
FIGS. 2B and 2C are diagrams providing respective top and bottom perspective views of the flange of the spigot assembly of FIG. 2A.
Figure 2B:
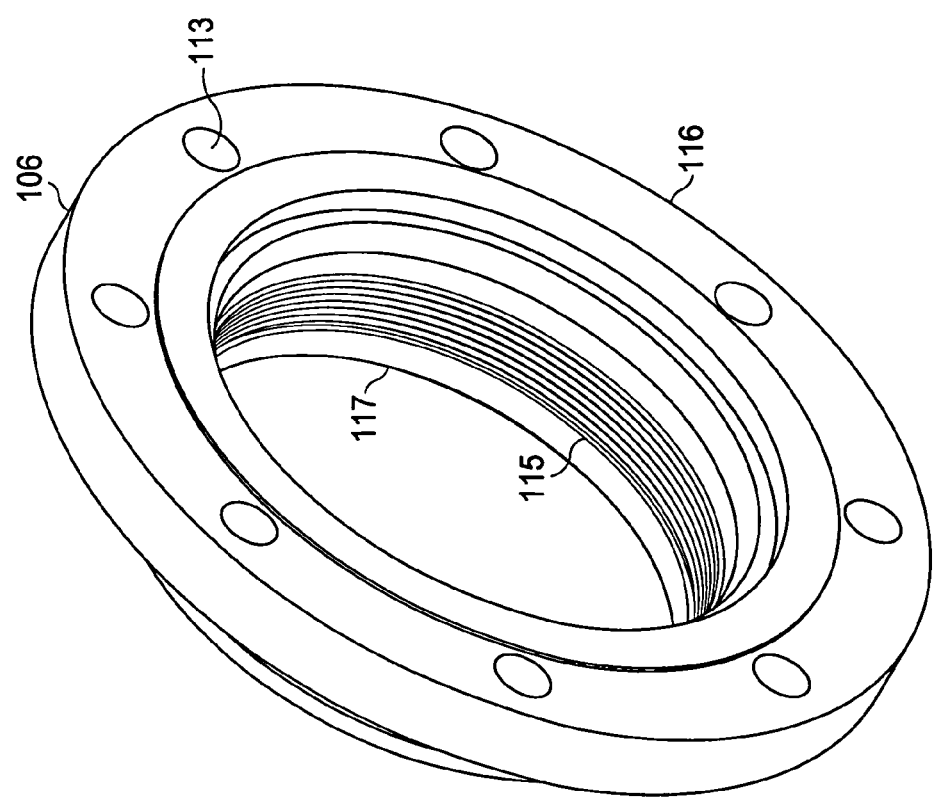

FIG. 2A shows spigot assembly 104 in further detail. As discussed further below, the wall thickness of spigot pipe 105 is significantly reduced over the wall thickness of similar spigot pipes used in the prior art. FIGS. 2B and 2C show spigot flange 106 in further detail. Spigot flange 106 includes a flange plate 116 having a set of apertures for receiving bolts for fastening spigot flange 106 with flange cover 110 of FIG. 1A or to a valve during tapping and plugging (line-stopping) operations. Additionally, the lower surface of flange plate 116 includes a set of recesses 114, which advantageously reduce the weight and cost of spigot flange 106 by reducing the amount of metal used to fabricate spigot flange 106.

The barrel 117 of flange 106 extends perpendicular to flange plate 116. The inner walls of flange plate 116 and barrel 117 define a continuous aperture that allows line stopping equipment to pass during line stopping operations. Flange barrel 117, in the illustrated embodiment, includes a set of threads 115 for receiving threaded plug 107 of FIG. 1A. Preferably, flange 106, including flange plate 116 and flange barrel 117, are integrally formed as a single metallic casting.

Figure 3A:
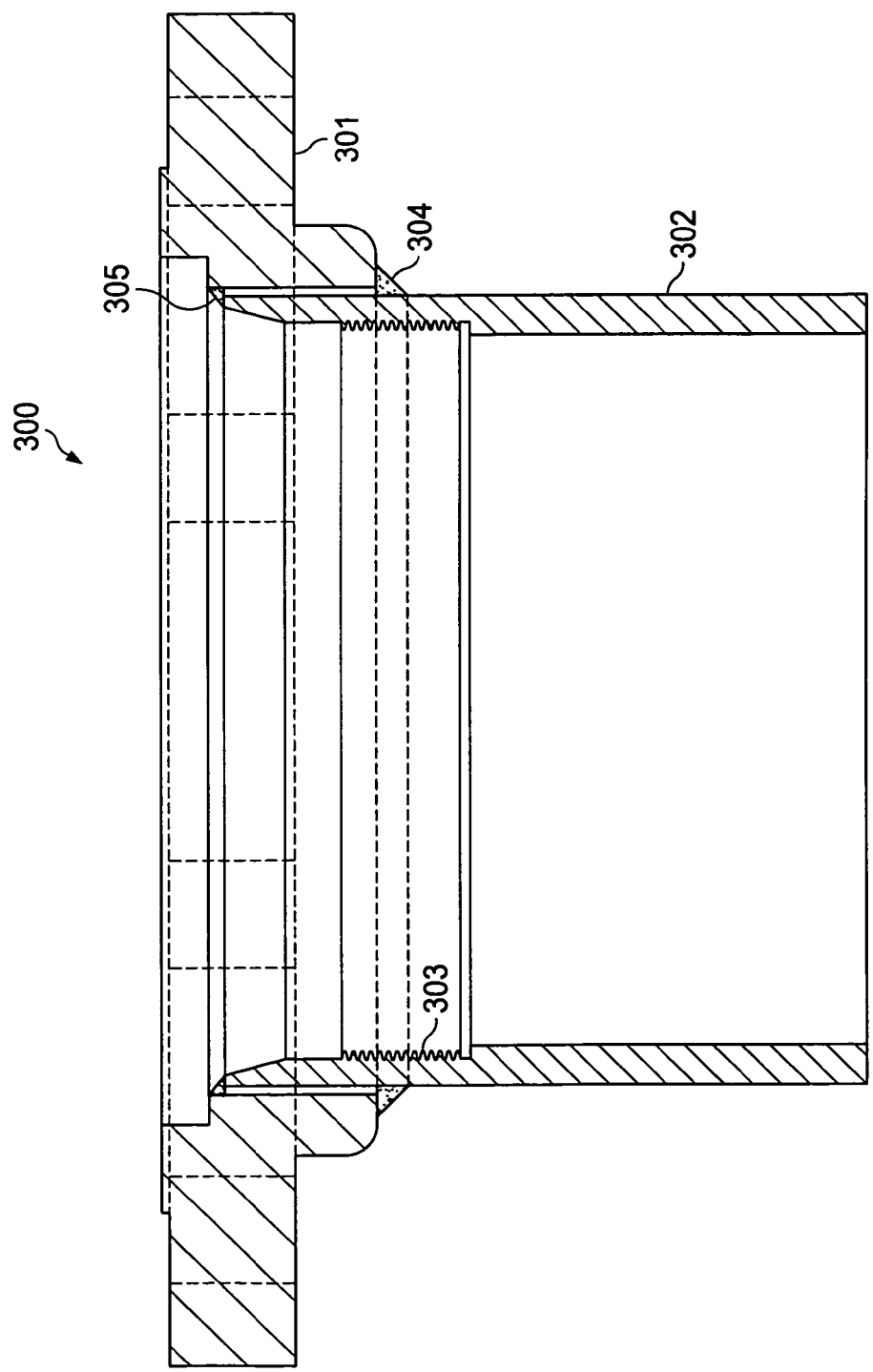
FIG. 3A is a diagram showing a first prior art spigot assembly including a spigot flange and spigot pipe.
Figure 3B:
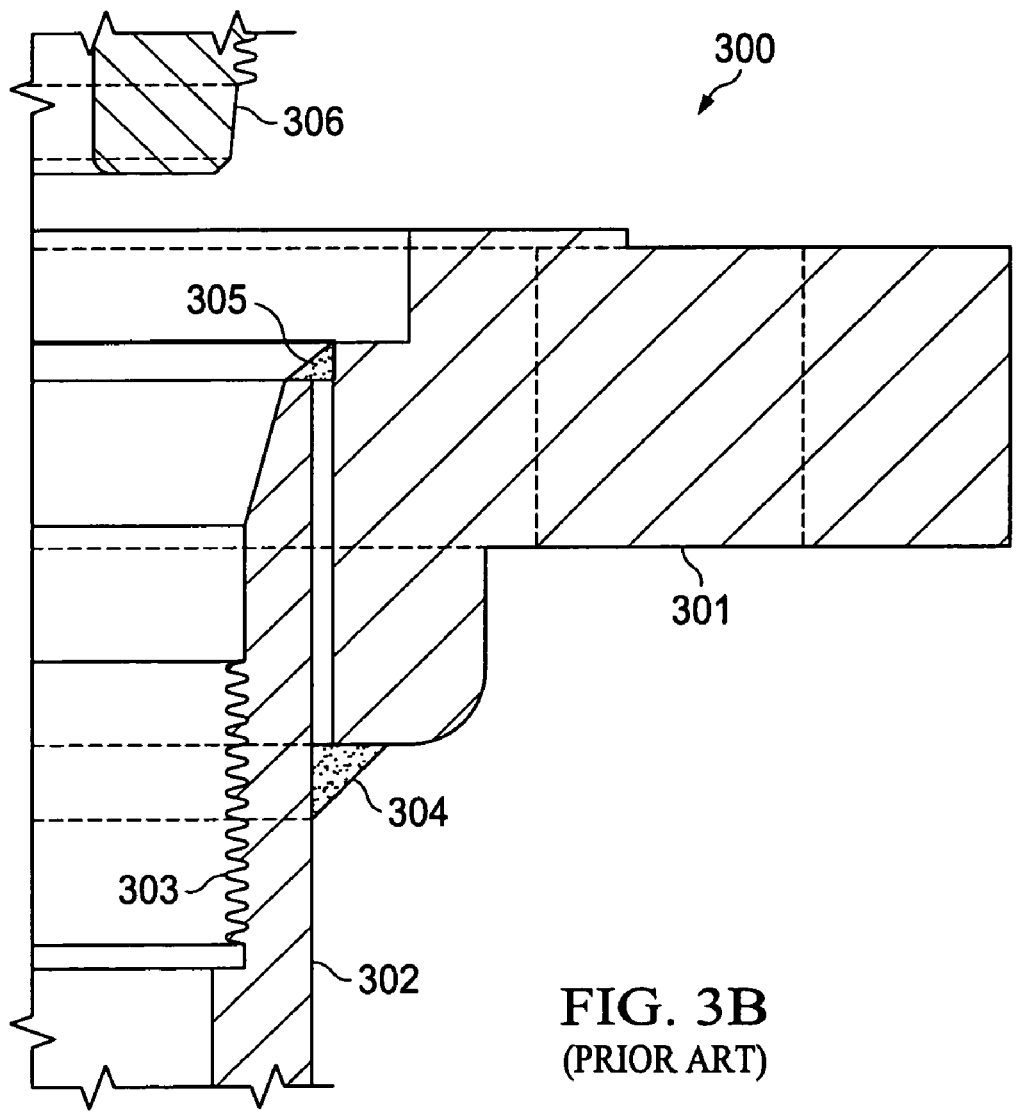
FIG. 3B is a diagram providing a cutaway view of the spigot assembly of FIG. 3A, particularly showing the prior art interface between the spigot flange and spigot pipe in further detail.

FIGS. 3A and 3B provide cutaway views of one typical prior art spigot assembly 300. Spigot assembly includes a conventional spigot flange 301 and a conventional spigot pipe 302. The circular inner wall of spigot pipe 302 includes threads 303, which receive a conventional threaded plug 306 (FIG. 3B).

In prior art spigot assembly 300, a distal potion of the circular wall of spigot pipe 302 is received within the circular inner aperture of spigot flange 301. Spigot flange 301 and spigot pipe 302 are then welded together. In particular, a first slip weld 304 is welded around the circular interface between the outer wall of spigot pipe 302 and the lower outer surface of spigot flange 301. A second slip weld 305 is welded around the circular interface between the distal end of spigot pipe 301 and the inner surface of spigot flange 301.

One significant problem with prior art spigot assembly 300 is that the wall of spigot pipe 302 must be thick enough to allow for the tapping of threads 303 without substantially reducing the stiffness and strength of spigot pipe 302. (As discussed further below, for an eight inch (8") diameter spigot pipe 302, the spigot pipe wall thickness is approximately one third inch (0.322"), in accordance with ASME/ANSI Standard 36.10M, Schedule 40, for carbon steel or ASME/ANSI Standard 36.19M Schedule 40, for stainless steel). Furthermore, the fabrication of spigot assembly 300 requires two (2) structural welds (i.e. welds 304 and 305), which add extra time, effort, and expense to the fabrication process.

Figure 4A:
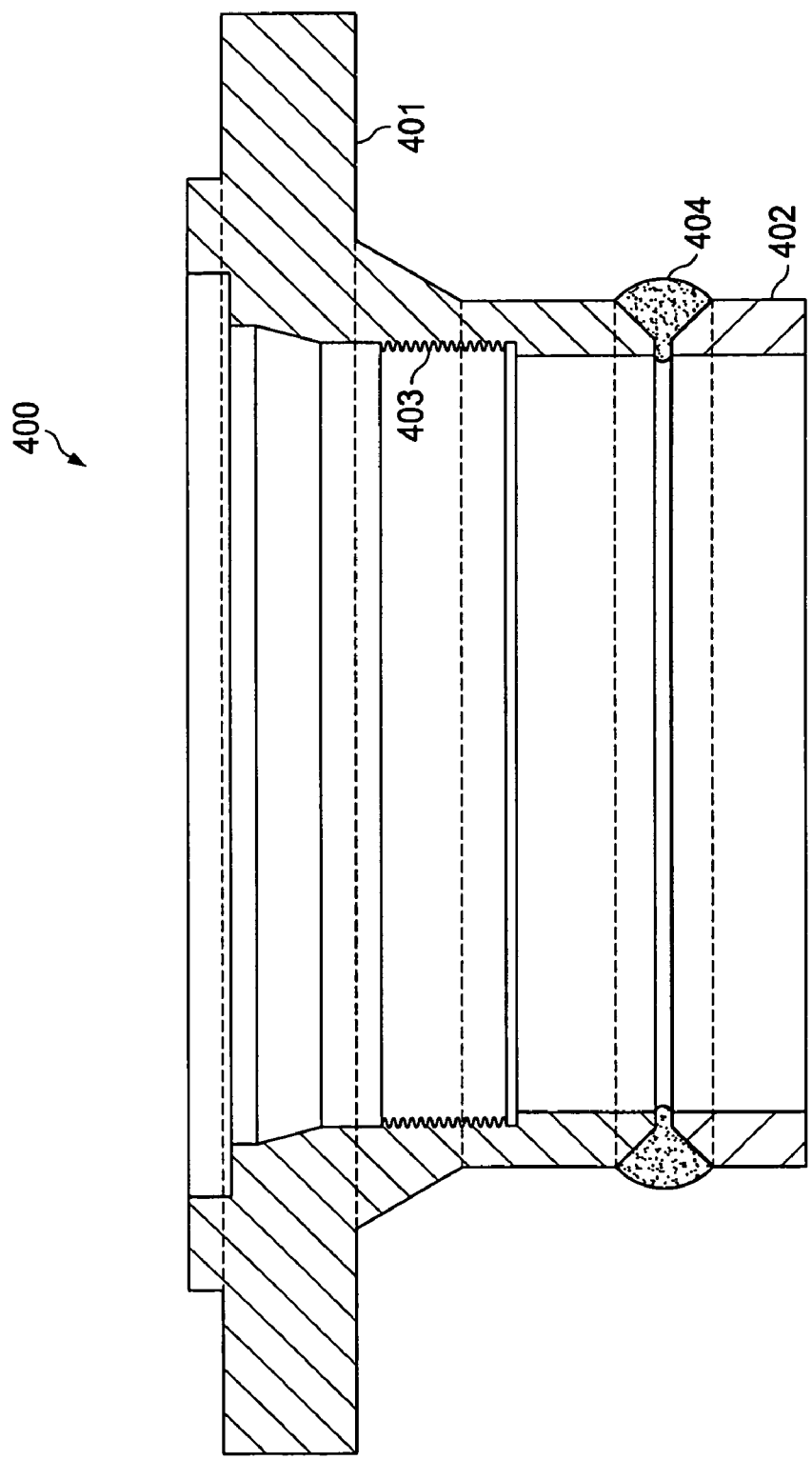
FIG. 4A is a diagram showing a second prior art spigot assembly including a spigot flange and spigot pipe.
Figure 4B:
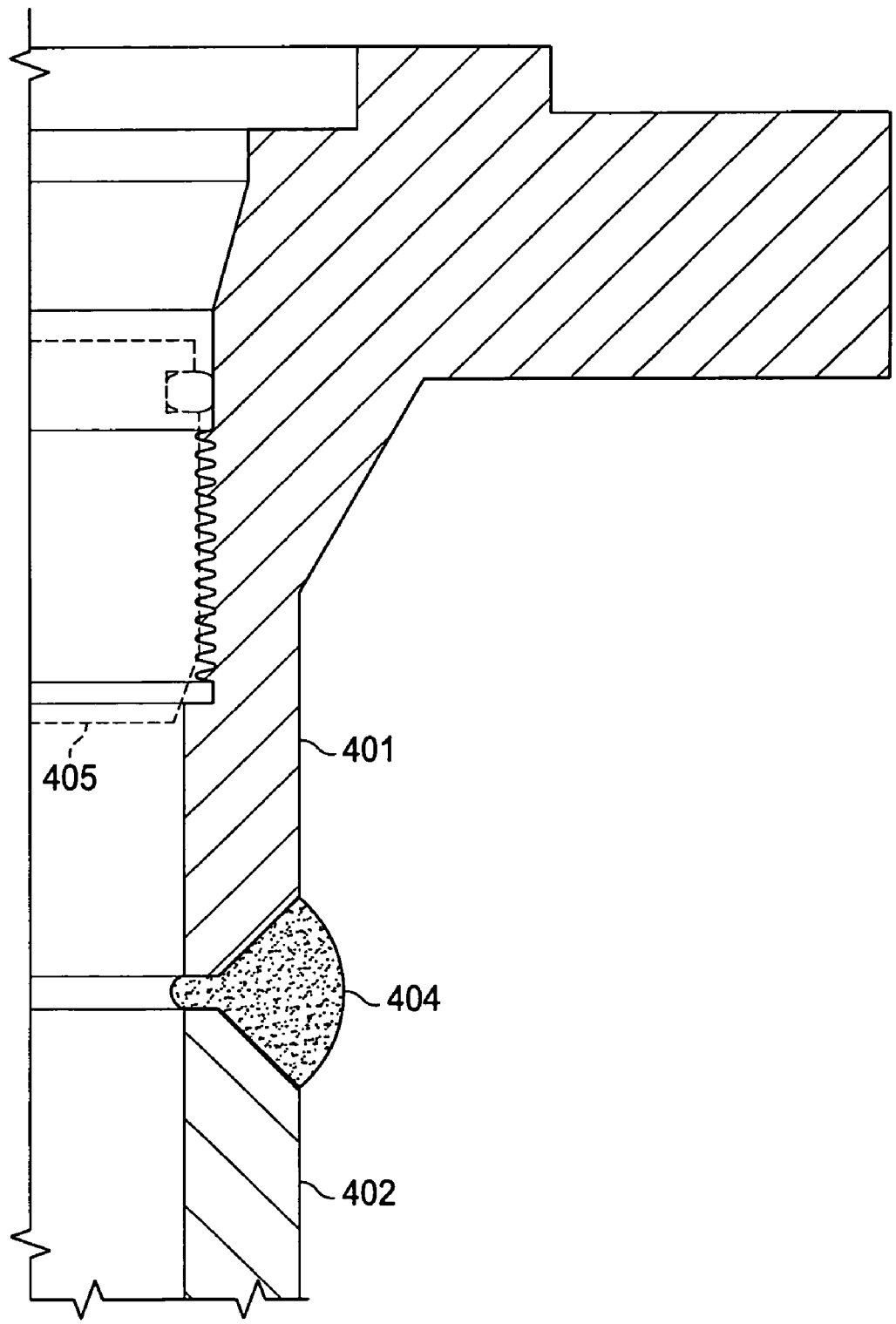
FIG. 4B is a diagram providing a cutaway view of the spigot assembly of FIG. 4A, particularly showing the prior art interface between the spigot flange and spigot pipe in further detail.

FIGS. 4A and 4B provide cutaway views of another prior art spigot assembly 400, which includes a conventional spigot flange 401 and a conventional spigot pipe 402. In spigot assembly 400, threads 403, which receive a conventional threaded plug, are disposed on the inner surface of spigot flange 401. (A partial view of a conventional threaded plug 405 is generally shown by dashed lines in FIG. 4B.) The distal edges of spigot flange 401 and spigot pipe 402 are designed and then welded together with a butt weld 404 that extends all the way along circular flange-pipe interface.

The wall thickness of spigot pipe 402 must be thick enough to support butt weld 404 and therefore approximates the wall thickness of the corresponding distal edge of spigot flange 401. For a standard eight inch ("8) spigot pipe 402, the pipe wall thickness is approximately one-third inch ($\frac{1}{3}$"), in accordance with ASME/ANSI Schedule 40.

Figure 5A:
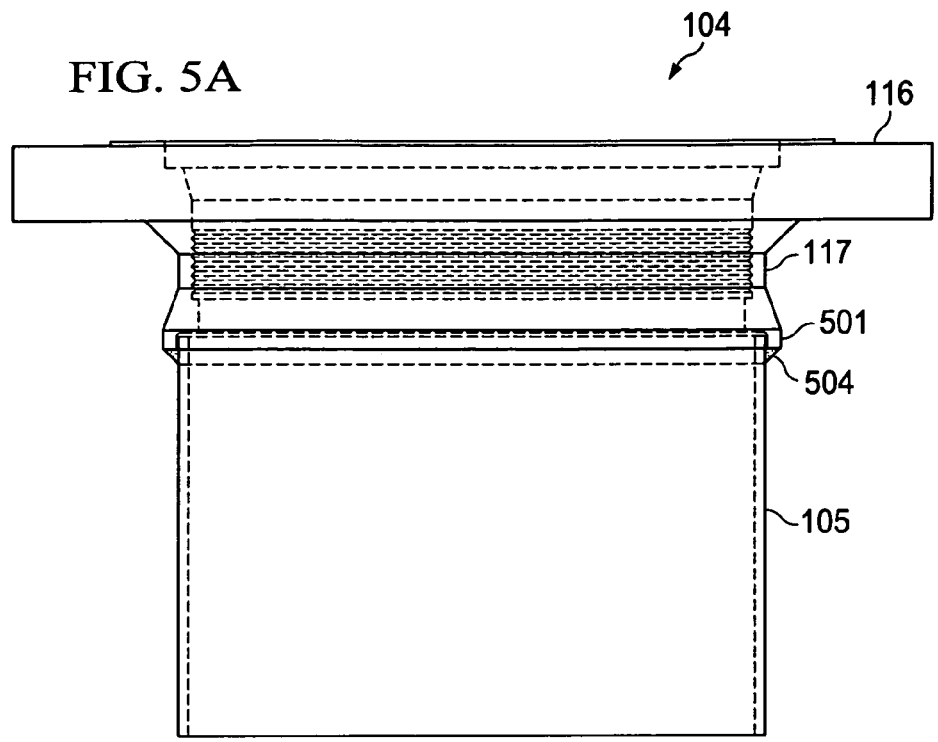
FIG. 5A is a diagram providing a side view of a spigot assembly, including a spigot flange and spigot pipe, according to a representative of the principles of the present invention.
Figure 5B:
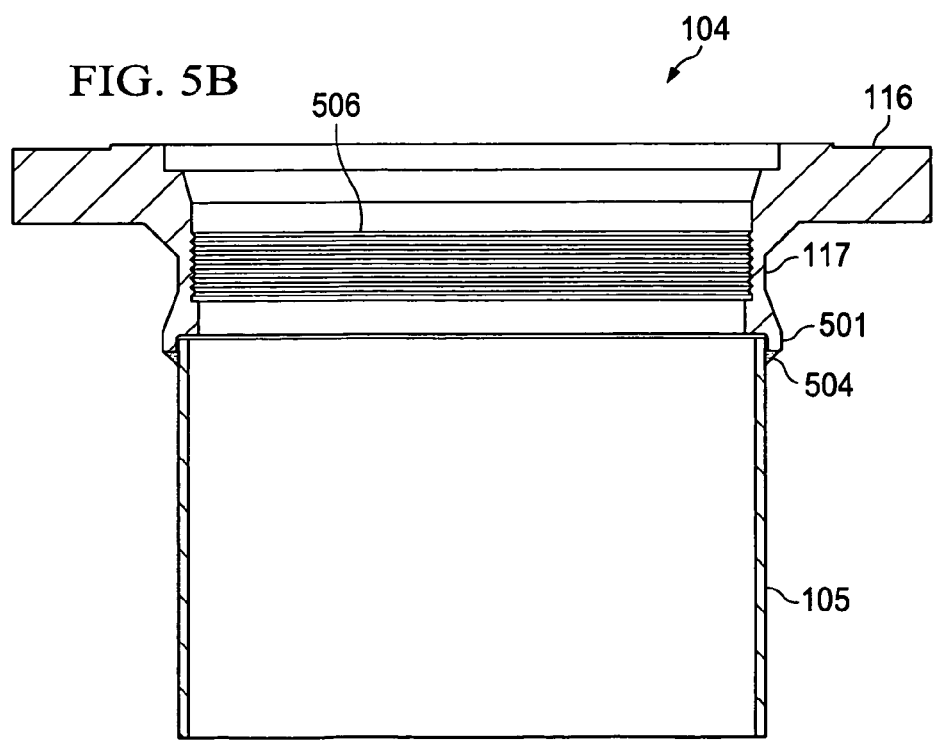
FIG. 5B is a diagram providing a side cutaway view of the spigot assembly of FIG. 5A.

FIGS. 5A-5C show a preferred embodiment of spigot assembly 104 according to the principles of the present invention. Generally, the body of spigot flange barrel 117 is perpendicular to the body of flange plate 116, as indicated by dashed lines 500a and 500b. In the preferred embodiment, flange barrel 117 and flange plate 116 are integrally formed in a single steel casting, although alternatively, they could be separately formed and then fastened together, for example by welding or screwed together using threads.

As shown in particular detail in FIG. 5C, spigot flange barrel 117 includes a projection 501 that extends around the periphery of the flange circular aperture to define a circular socket area 502. Projection 501 in the preferred embodiment is integrally formed during the casting of spigot flange barrel 117 and spigot flange plate 116; however, in alternate embodiments, projection 501 may formed from one or more discrete pieces that are fastened to spigot flange barrel 117, for example with welds or with threads.

Circular socket area 502 receives a corresponding end 503 of spigot pipe 105. A gap 504 of approximately $\frac{1}{16}$" is provided between end 503 of spigot pipe 105 and the surrounding sidewalls of projection 501 of flange barrel 117. Gap 504 accounts for expansion of the metal of spigot pipe 105 and flange barrel 117 during welding, which advantageously prevents spigot pipe 105 and spigot flange barrel 117 from cracking. Gap 504 is created, for example, by inserting a shim between spigot pipe 105 and flange barrel 117, tack welding spigot pipe 105 and spigot barrel 117 together during fit-up, and then removing the shim before full welding of spigot pipe 105 and flange barrel 117.

During full welding, a socket weld 505 is welded along the circular socket area defined by the outer surface of spigot pipe 105 proximate end 503 and the end surface 506 of projection 501 of flange barrel 117. A finish weld 507 is also provided between the inner edge 508 of end 503 of spigot pipe 105 and the corresponding end surface 509 of flange barrel 117. Finish weld 507 is non-structural, but advantageously prevents crevice corrosion in the surrounding steel. In the illustrated embodiment, threads 510 are provided on the inner wall of flange barrel for receiving a threaded plug, such as threaded plug 107 of FIG. 1A.

One significant advantage of the embodiments of the present invention, as demonstrated in FIGS. 5A-5C, is the reduced wall thickness of spigot pipe 105. In particular, the principles of the present invention allow a spigot assembly, such as spigot assembly 104, to be fabricated using a spigot pipe (e.g. spigot pipe 105) having a thickness equal to or thinner than the thickness provided for by ASME/ANSI Standard 36.10M Schedule 20 (carbon steel pipe) or ASME/ANSI Standard 36.19M Schedule 20 (stainless steel pipe) for that diameter pipe. In the preferred embodiment, spigot pipe 105 is selected in accordance with Schedule 10 of ASME/ANSI Standard 36.10M, if carbon steel pipe is used, or Schedule 10 of ASME/ANSI Standard 36.19M, if stainless steel pipe is used. This is in contrast to prior art spigot assemblies, such as spigot assemblies 300 and 400 discussed above, which are constructed with Schedule 40 thickness spigot pipes in accordance with ASME/ANSI Standard 36.10M or ASME/ANSI Standard 36.19M. Table 1 provides a representative comparison between ASME/ANSI Standard 36.10M Schedules 10 and 40 wall thicknesses for exemplary spigot pipes of a selected number of diameters. (A similar comparison can be made for Schedules 10 and 40 of ASME/ANSI Standard 36.19M.) Thicknesses for other schedules and diameters can be found in the ASME/ANSI Standards 36.10M and 36.19M, which are incorporated herein by reference.

| Outlet Size (Spigot Pipe 105 Diameter) | Schedule 10 Wall Thickness (Spigot Pipe 105) | Schedule 40 Wall Thickness (Prior Art) |
| --- | --- | --- |
| 4" | 0.120" | 0.237" |
| 6" | 0.134" | 0.280" |
| 8" | 0.148" | 0.322" |
| 10" | 0.165" | 0.365" |
| 12" | 0.180" | 0.406" |

FIGS. 6A-6D illustrate an alternate embodiment of the principles of the present invention in which a conventional pin-type plug 600 is used in place of threaded plug 107 of FIG. 1A. In this embodiment, shown in FIG. 6A, recesses 114 in the back face of flange plate 116 are spaced to provide areas 601 generally having the full thickness of flange plate 116. Areas 601 allow horizontal apertures 602 to be formed, which extend though areas 601 of flange plate 116 and into the flange center aperture. Apertures are adapted to receive conventional pins (not shown). In the illustrated embodiment, four (4) generally orthogonal apertures 602 are provided, two of which are visible in FIG. 6A.

Figure 6A:
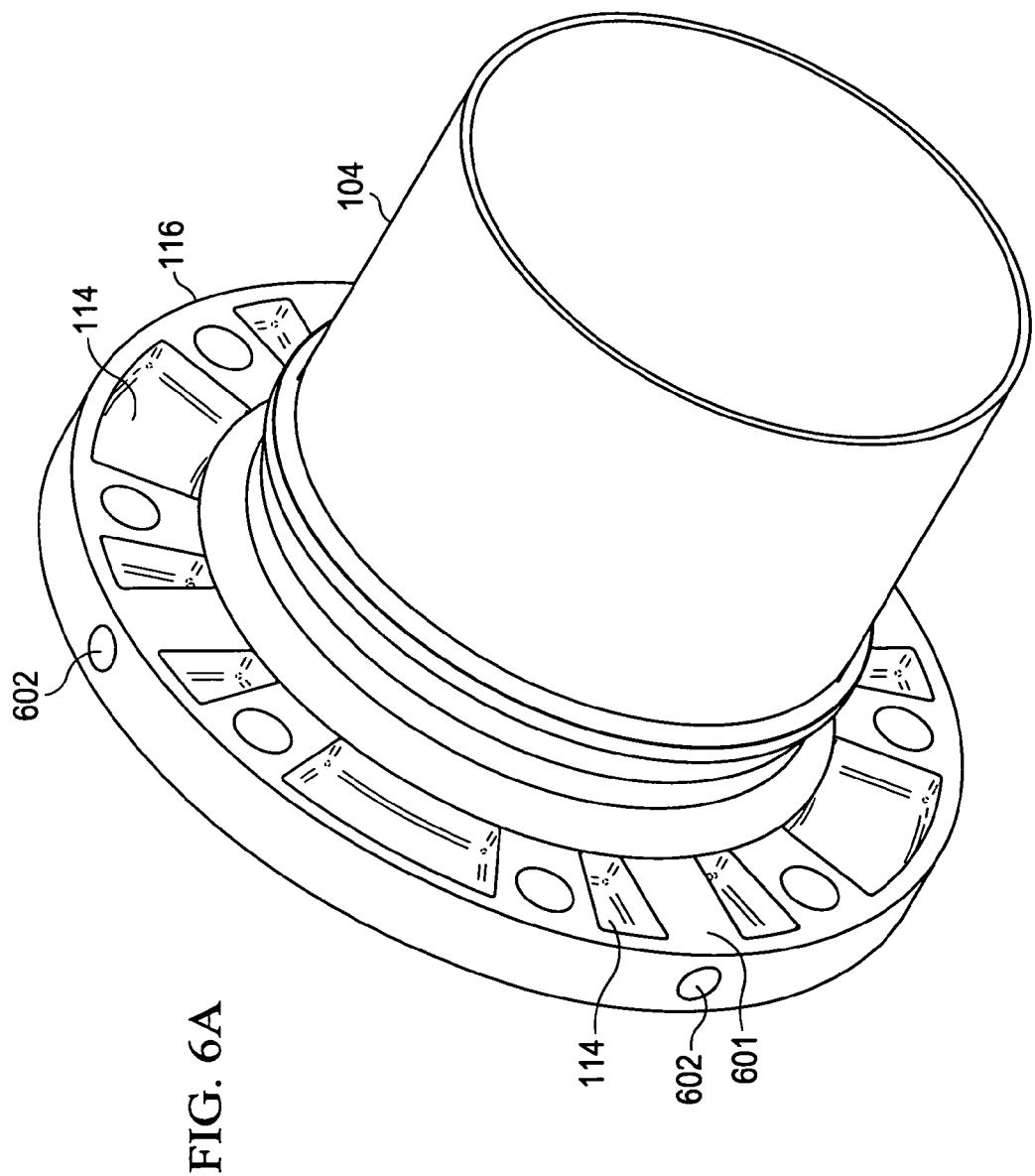
FIGS. 6A-6D are diagrams of an alternate embodiment of the principles of the present invention that utilizes a pin-type plug for sealing the spigot pipe of FIG. 1A.
Figure 6B:
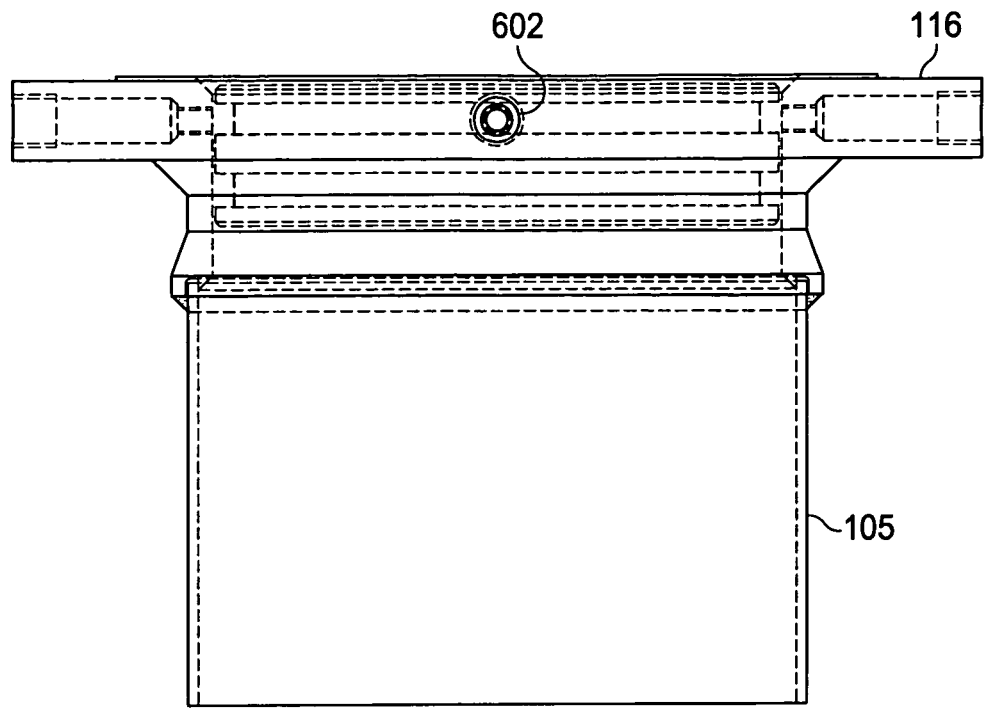
Figure 6C:
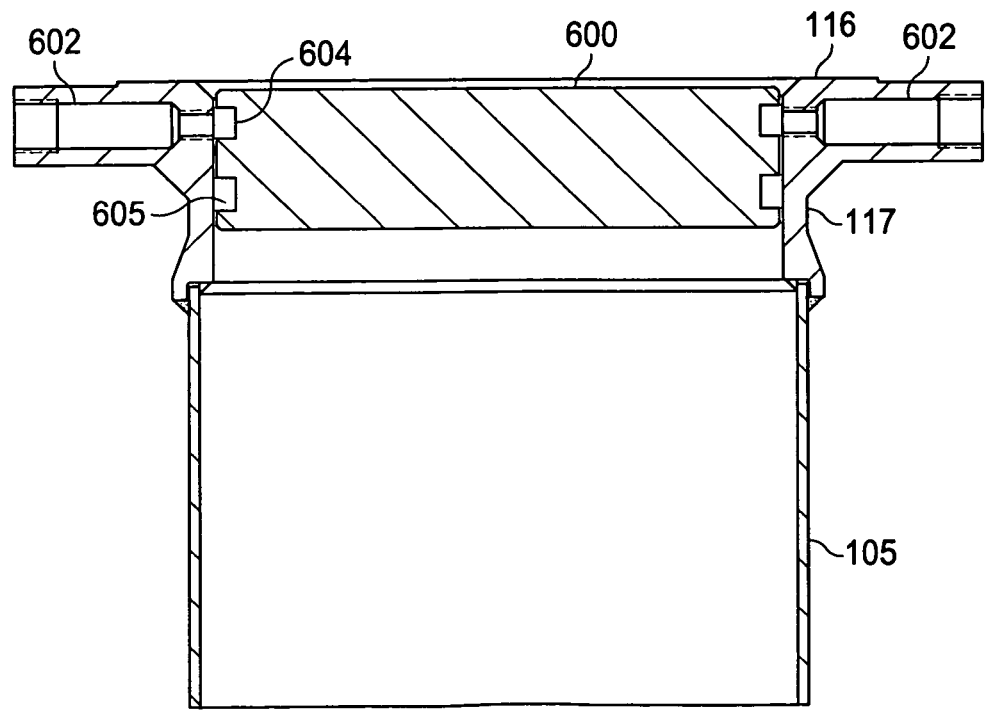
Figure 6D:
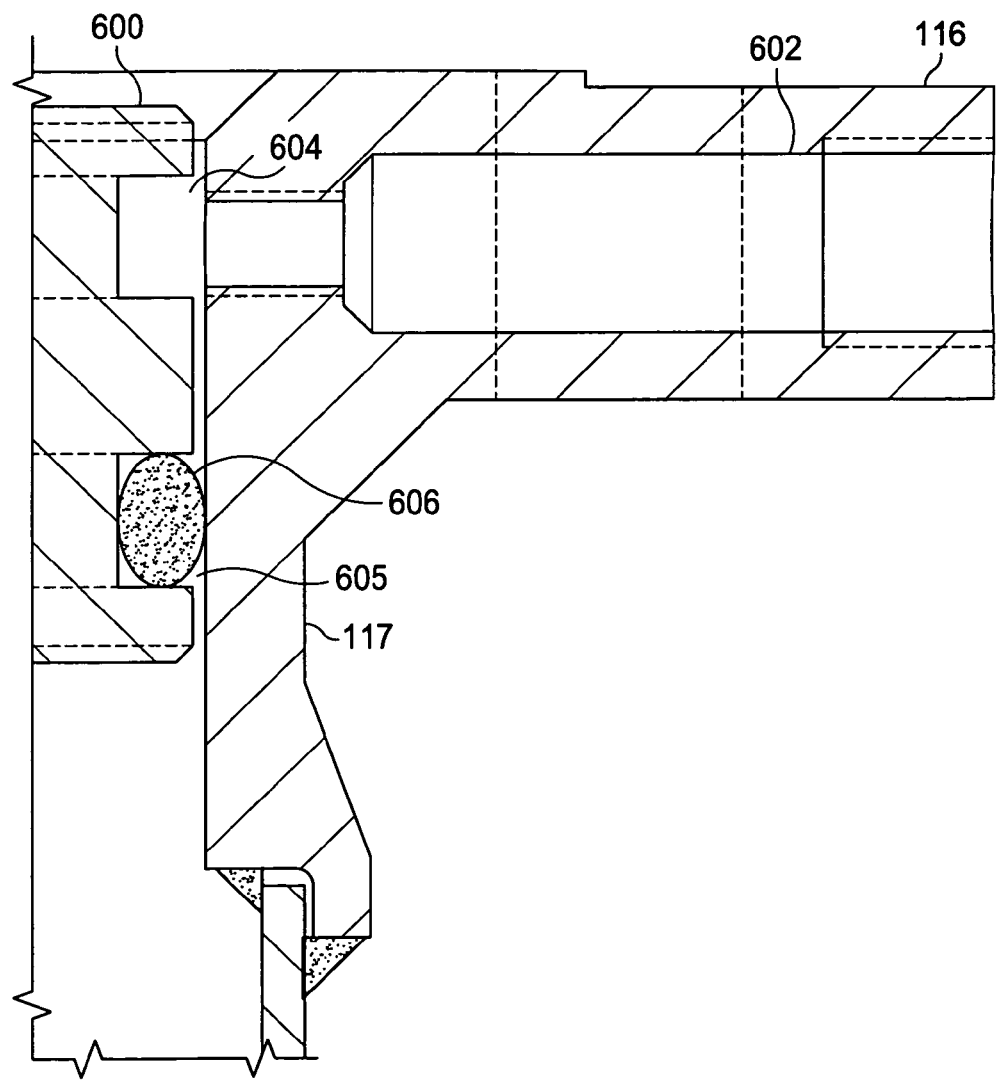

As shown in FIGS. 6B-6D, apertures 602 in flange plate 116 are threaded and extend through flange plate 116 to the flange center aperture. In use, conventional pins are screwed into threaded apertures 602 and engage an upper groove 604 formed around the periphery of plug 600. A second lower groove 605 holds a rubber o-ring gasket 606, which provides the seal described above.

The reduction in thickness of the wall of spigot pipe 105 directly reduces the cost of fabricating spigot assembly 104, and in turn the cost of fabricating tapping/plugging assembly 100. For example, when stainless steel is used, the thicker-walled pipe used to fabricate the prior art spigot assemblies can cost approximately $200 per linear foot. On the other hand, when stainless steel is used in embodiments of the present invention, the cost of the 0.180 inch thick pipe used to fabricate 12 inch spigot pipes 105, for example, can be reduced to approximately $50 per linear foot.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A line-stopping spigot comprising:
    a flange including:
        a flange plate; and
        a flange barrel comprising a wall extending from the flange plate, an end of the wall of the flange barrel opposing the flange plate having a projection defining a periphery of a socket area, the socket area including a shoulder within the periphery of the projection, for receiving an end of a pipe; and
    a pipe comprising a continuous wall of a selected thickness, an end of the wall of the pipe inserted within the periphery of the socket area defined by the projection of the flange barrel.

2. The spigot of claim 1, further comprising socket welding including a weld disposed between an end surface of the projection of the flange barrel and a corresponding area of an outer surface of the wall of the pipe and a weld disposed between an inner surface of the wall of the pipe and the shoulder of the flange barrel.

3. The spigot of claim 1, wherein the pipe has a diameter and the width of the wall of the pipe corresponds to the diameter of the pipe in accordance with ASME/ANSI Schedule 10.

4. The spigot of claim 1, wherein the flange plate is fabricated integrally with the flange barrel.

5. The spigot of claim 1, wherein the flange plate and flange barrel are fabricated from steel.

6. The spigot of claim 5, wherein the flange plate and the flange barrel are fabricated from stainless steel.

7. The spigot of claim 1, further comprising threads disposed along a selected inner surface of the wall of the flange barrel for receiving a threaded plug.

8. The spigot of claim 1, wherein the flange plate includes a plurality of recesses disposed along a selected surface of the flange plate for reducing weight.

9. The spigot of claim 1, further comprising a finishing weld welded between an inner surface of the pipe and an inner surface of the flange barrel.

10. A spigot for use during line-stopping comprising:
a flange including a tubular portion having a continuous sidewall of a selected inner diameter and a projection of a greater inner diameter extending along a periphery of an end of the tubular portion to define a socket area including a shoulder within the periphery of the projection; and
a pipe having a diameter and an end inserted within the socket area defined by the projection of the flange, wherein a thickness of the pipe in the socket area is equal to or thinner than the thickness provided for by ASME/ANSI Schedule 20 for that diameter.

11. The spigot of claim 10, wherein a thickness of the pipe in the socket area is equal to or thinner than the thickness provided for by ASME/ANSI Schedule 10 for that diameter.

12. The spigot of claim 10, wherein a gap of a selected width is disposed between an inner surfaces of the projection adjacent the socket area and an outer surface of the pipe proximate the end of the pipe.

13. The spigot of claim 10, wherein a gap of a selected width is disposed between an end surface of the pipe and a corresponding end surface of the tubular portion of the flange adjacent the socket area.

14. The spigot of claim 10, wherein the pipe is fabricated from a metal selected from the group consisting of steel and stainless steel.

15. The spigot of claim 10, wherein the flange is fabricated from a metal selected from the group consisting of steel and stainless steel.

16. The spigot of claim 10, wherein the flange includes a flange plate having a plurality of recesses in a selected surface of the flange plate for reducing weight.

17. The spigot of claim 16, wherein the flange plate further comprises a thick area disposed between first and second ones of the recesses and having an aperture therethrough for receiving a plug retaining pin.

18. The spigot of claim 10, further comprising a plurality of threads disposed in an inner surface of the sidewall of the flange and spaced from the socket area.

19. The spigot of claim 12, wherein the pipe is fastened to the tubular portion of the flange with a socket weld disposed between an area of an outer surface of the pipe and an adjacent portion of an outer surface of the projection of the flange.

20. A line-stopping sleeve assembly comprising:
a half-sleeve adapted to receive a corresponding surface of a section of pipe; and
a spigot assembly extending from the half-sleeve and including a flange and a spigot pipe attached to the flange, wherein the spigot pipe has a diameter and a sidewall thickness equal to or thinner than the thickness provided for by ASME/ANSI Schedule 20 for that diameter, wherein the flange includes a tubular portion having a projection defining a shoulder extending inwardly along an inner periphery of an end of the tubular portion to provide a socket and wherein an end of the pipe is inserted within the socket and has outer surface fastened to an end of the projection with a socket weld.

21. A pipeline system comprising:
a section of pipe; and
a line-stopping spigot fastened to the section of pipe comprising:
a flange including a tubular portion having a continuous sidewall of a selected inner diameter and a projection of a greater inner diameter extending along a periphery of an end of the tubular portion to define a socket area including a shoulder within the periphery of the projection; and
a spigot pipe having a diameter and an end inserted within the socket area defined by the projection of the flange, wherein a thickness of the spigot pipe in the socket area is equal to or thinner than the thickness provided for by ASME/ANSI Schedule 20 for that diameter.

22. The pipeline system of claim 21, wherein the line-stopping spigot is attached to the section of pipe through a half-sheath.

23. The pipeline system of claim 22, wherein the half-sheath is attached to the section of pipe with another half-sheath.

24. The pipeline system of claim 22, wherein the half-sheath is welded to the section of pipe.

25. The pipeline system of claim 21, wherein the line-stopping spigot is welded to the section of pipe.

26. A method of performing work on a pipe comprising:
fastening a spigot to a section of pipe, the spigot comprising:
a flange including a tubular portion having a continuous sidewall of a selected inner diameter and a projection of a greater inner diameter extending along a periphery of an end of the tubular portion to define a socket area including a shoulder within the periphery of the projection; and
a spigot pipe having a diameter and an end inserted within the socket area defined by the projection of the flange, wherein a maximum thickness of the spigot pipe in the socket area is proportional to the diameter of the spigot pipe in accordance with ASME/ANSI Schedule 20; and
accessing the section of pipe through an aperture through the spigot.

27. The method of claim 26, wherein accessing the section of pipe comprises tapping the section of pipe through the aperture through the spigot.

28. The method of claim 26, wherein accessing the section of pipe comprises extending line-stopping equipment through the aperture through the spigot.

* * * * *